US006970565B1

(12) United States Patent
Rindsberg

(10) Patent No.: US 6,970,565 B1
(45) Date of Patent: Nov. 29, 2005

(54) APPARATUS FOR AND METHOD OF SECURELY DOWNLOADING AND INSTALLING A PROGRAM PATCH IN A PROCESSING DEVICE

(75) Inventor: Mark Rindsberg, Boca Raton, FL (US)

(73) Assignee: XM Satellite Radio Inc., Washington, DC (US)

( * ) Notice: Subject to any disclaimer, the term of this patent is extended or adjusted under 35 U.S.C. 154(b) by 787 days.

(21) Appl. No.: 09/747,567

(22) Filed: Dec. 22, 2000

(51) Int. Cl.[7] .............................................. H04K 1/00
(52) U.S. Cl. ..................................................... 380/270
(58) Field of Search ....................................... 380/270

(56) References Cited

U.S. PATENT DOCUMENTS

| | | | |
|---|---|---|---|
| 5,319,673 A | 6/1994 | Briskman | 375/1 |
| 5,485,485 A | 1/1996 | Briskman et al. | 375/200 |
| 5,592,471 A | 1/1997 | Briskman | 455/52.3 |
| 5,699,275 A * | 12/1997 | Beasley et al. | 709/221 |
| 5,794,138 A * | 8/1998 | Briskman | 455/344 |
| 5,870,390 A | 2/1999 | Campanella | 370/326 |
| 5,901,225 A * | 5/1999 | Ireton et al. | 714/7 |
| 6,199,204 B1 | 3/2001 | Donohue | 717/11 |
| 6,247,168 B1 * | 6/2001 | Green | 717/176 |

* cited by examiner

Primary Examiner—Andrew Caldwell
Assistant Examiner—Jacob Lipman
(74) Attorney, Agent, or Firm—Zaretsky & Associates; Howard Zaretsky

(57) ABSTRACT

A novel and useful apparatus for and method of securely downloading and installing a patch program in a processing device. Each processing device is assigned a unique key embedded therein during manufacture and has knowledge of a shared key. The program patch is encrypted using the shared key and transmitted over a communication link, such as a satellite radio link, to each device. The patch is decrypted using the shared key and re-encrypted using the unique key known only to the device itself. The re-encrypted patch program is stored in nonvolatile memory and upon reset of the device, the encrypted patch contents are read out of the nonvolatile memory, decrypted using the unique key and loaded into patch memory for execution by the processing device.

64 Claims, 5 Drawing Sheets

APPARATUS FOR AND METHOD OF SECURELY DOWNLOADING AND INSTALLING A PROGRAM PATCH IN A PROCESSING DEVICE

FIELD OF THE INVENTION

The present invention relates generally to computer processing devices and more particularly relates to an apparatus for and method of securely downloading and installing a program patch in a processing device. The invention is particularly useful when the processing device is a mobile communications platform and the program patch is transmitted over a channel accessible to hackers.

BACKGROUND OF THE INVENTION

In recent years, the world has witnessed explosive growth in the demand for wireless communications and it is predicted that this demand will increase in the future. There are already over 500 million users subscribing to cellular telephone services and the number is continually increasing. Eventually, in the not too distant future, the number of cellular subscribers will exceed the number of fixed line telephone installations.

Other related wireless technologies have experienced growth similar to that of cellular. For example, cordless telephony, two way radio trunking systems, paging (one way and two way), messaging, wireless local area networks (WLANs) and wireless local loops (WLLs).

A new type of wireless service, digital satellite ratio is expected to begin service in the near future. In this type of paid subscription service, the programming contents of dozens or hundreds of stations are broadcast via satellite to fixed or mobile radio receiver platforms. It is predicted that there will eventually be tens or possibly hundreds of millions of radio platforms capable of receiving such types of broadcast signals.

One component all these types of wireless communication devices (i.e. receivers, transceivers, etc.) have in common is the processing device. Cellular transceivers, satellite radios, etc. all have some form of data or signal processing components that utilize firmware or software in their operation. Subsequent to the manufacturing of these devices, it may often be required to upgrade them with new versions of firmware or software. Typically it is not possible to upgrade the firmware in thousands or millions of devices once they are distributed in the field.

A diagram illustrating the internal architecture of a general purpose processing device is shown in FIG. 1. The device, generally referenced 10, comprises program memory, data memory, a processing core and other peripherals such as communication ports. Often, the processing device is optimized for certain applications or tasks. For example, the device may be optimized for signal processing tasks. In this case, the device 10 comprises program read only memory (ROM) 20, patch random access memory (RAM) 22, data ROM 12, data RAM 14 and a processing core 16 optimized to perform digital signal processing (DSP) operations. The device also comprises one or more interfaces including communication ports 19 and a host interface 18.

The host device 24 communicates with the DSP device via host interface 18. The host may comprise a personal computer (PC), microprocessor, microcomputer or any other computing platform that functions as a host to the DSP device 10. Typically, the host 24 comprises program memory, data memory and some form of nonvolatile memory 26 such as EEPROM, EEPROM, Flash, etc.

In a typical arrangement, the host performs more general tasks such as providing the user interface, running a real time operating system, managing tasks, memory, I/O, etc. More sophisticated signal processing functions are handled by a processor more optimized for handling signal processing tasks, such as DSP device 10.

Program code for such a DSP device is developed and burned into the device during manufacturing of the Integrated Circuit (IC). The program is thus ROMed once it is finalized. As happens often in complex processor designs running large sophisticated programs, one or more bugs are discovered after the device is manufactured and distributed in a product. In order to fix the one or more bugs, the program code must be modified. This requires that a portion of the program code ROM 20 must be updated. The updates may comprise removing, adding or changing program code.

In such cases, a technique, well known in the art, is used whereby the modifications to the program are stored in nonvolatile memory 26 in the host. The patch RAM 22 is loaded from the host memory via the host interface every time the device is reset. The DSP or other processing device is constructed such that the patch RMA is within the program code (i.e. program RAM 20) address space. The format of the patch RAM typically comprises a plurality of patches wherein each patch includes a start address and end address followed by the data to be inserted between the start and end address. Thus, the processor knows where to insert the patch and knows the length of the patch.

At the start of operation of the processor, the program counter begins counting. When the program counter reaches an address that matches a start address in the patch RAM, an internal trap is generated and the processor reads and executes the program as contained in the patch RAM rather than the program ROM 20.

Thus, in this manner, the patch RAM mechanism can be used (1) to correct errors after a program ROM or processor containing an internal program ROM is released and (2) to permit the development of the device or product to continue whereby the differences between software revisions, including changes and bug fixes, can be installed in existing products by placing the differences in patch memory.

A problem arises, however, when the program code needs to be updated and is stored in nonvolatile memory and incorporated in products that are in consumer's hands dispersed over a large geographic area. In this case, remote downloading is logistically difficult and by nature insecure. Many consumer products are generally packaged in a 'closed' manner without any easy access to any data ports. Once a device or product is in the field in consumer's hands, it is difficult to perform program updates. In such cases, users must return products to a central facility to perform the update. Imposing this requirement on consumers is very burdensome and is likely to be met with resistance and reluctance in the marketplace, and in addition is most likely to be very costly to the manufacture and/or distributor.

One solution to this problem is to distribute the patch program over a network that is accessible to consumers and the product, such as the Internet. Another solution is to distribute the patch over a wireless network if the product comprises some form of wireless communications such as a radio. In this case, messages, containing patch programs can be distributed periodically to each device over the wireless channel, e.g., cellular, satellite, etc.

Given such a download network, a mechanism is required for determining when the download is complete and whether the data received is correct. A length field included in the header information can be used to indicate when a download is complete. Further, a cyclic redundancy code (CRC) checksum is typically used to detect whether a download was received correctly.

Further, it is also desirable to know whether the download was received from the intended source. The device should have a mechanism of detecting if the download was legitimately transmitted from a known source or was injected by a hacker for purposes of compromising the system. In addition, it is desirable to store the downloaded patch program securely in memory so as to prevent tampering of the stored memory contents by hackers.

A disadvantage of the patch program distribution scheme described above, however, is that it is vulnerable to attack by hackers. This is especially the case when the processing device to be patched is a radio wherein the patch program is distributed over a satellite or terrestrial wireless network. For example, in a radio network that operates on a pad subscription basis, the activation and deactivation of radios is performed over the air. A hacker could access the patch contents and modify it in numerous ways, such as simulating a message to enable service on a particular radio for an indefinite period of time, enabling the reception of any number of premium channels, etc.

In the case where the programming content of the radio service is transmitted in an encrypted fashion, transmission of a cleartext version of the patch program potentially can enable a hacker to modify the program code so that it outputs the encryption keys stored in the device via a communications port, e.g., RS-232, etc. The encryption keys are normally used by the device to decrypt data received over the channel.

A hacker that gains access to the processor device via the patch program can (1) potentially gain knowledge of any encryption keys used, thus compromising the security of the radio system; (2) change the program to keep the radio in a state of perpetual activation/authorization, i.e. the radio can be programmed to ignore deactivation/deauthorization messages or to keep premium stations always authorized; and (3) utilize the ability to change the program contents to learn about the internal software algorithms, reverse engineer them and sell the algorithms to others to enable service.

Thus, there is need for a system for distributing program patch updates that is not vulnerable to attack by hackers and that does not lead to the security of the system being compromised.

SUMMARY OF THE INVENTION

Accordingly, the present invention provides a novel and useful apparatus for and method of securely downloading and installing a patch program in a processing device. The present invention is suitable for use with any type of processor whereby the program memory used by the processor is fixed, e.g., in ROM, at the time of manufacture and would be extremely difficult or impossible except via the use of a patch RAM or some other embedded software/firmware update method. For example, many consumer products comprise processors with software or firmware fixed at the time of manufacture. Once these products are released into the field, upgrades are extremely difficult to perform.

An illustrative example is provided wherein the processor comprises a digital signal processor (DSP) device in a digital radio adapted to receive programming content via direct broadcast over a wireless channel such as satellite, terrestrial wireless, cellular, etc. A large number of radios, potentially tens of millions, may be deployed in the field. As bugs are fixed and/or new features developed, new versions of the program code are developed. The differences between the new and old programs must then be downloaded and installed in each radio as a patch program. The invention provides a mechanism for achieving this in a secure and robust manner.

The present invention provides a mechanism for downloading and installing a patch program in a processing device in a secure manner. Each device is assigned a unique ID and key. In addition, a shared key is made known to all or a portion of all the devices. The program patch is first encrypted using the shared key and transmitted over a communication link to each device (e.g., each radio). It is important that the program patch be transmitted over the communication link (e.g., the wireless communication link) in an encrypted manner thus reducing the vulnerability of hackers intercepting the transmission and/or inserting their own version of the patch program.

Once received, the device decrypts the patch using the shared key and re-encrypts it using the unique key that is known only to the device itself. The decrypted patch program is then stored preferably in a host processor or computer, or alternatively in nonvolatile memory within the device itself. Upon each reset of the device, the encrypted patch contents are read out of the nonvolatile memory and loaded into data memory within the device. The patch contents are then decrypted using the unique key and the clear text version of the patch program is loaded into patch memory.

The device then begins execution from program memory. When an address within the range of addresses stored in the patch memory is encountered, a software trap is generated and the processor executes from the patch memory rather than the program memory.

The invention thus provides a secure method of downloading and storing/installing the patch from an external source over a channel potentially exposed to hackers. The present invention also provides a method of securely storing and installing the patch on the device.

There is thus provided in accordance with the present invention a method of securely downloading and installing patch data in a plurality of computing devices, each computing device having a processor, program memory and patch memory, the method comprising the steps of transmitting the patch data to the computing devices over a nonsecure channel in an encrypted manner utilizing a first key, receiving first encrypted patch data at a computing device and decrypting the first encrypted patch data utilizing the first key so as to generate clear patch data, verifying the integrity of the contents of the clear patch data; and if the verification passes, encrypting the clear patch data using a second key and storing the resultant second encrypted patch data in a data memory, retrieving the second encrypted patch data from the data memory and decrypting the second encrypted patch data using the second key so as to generate clear patch data and loading the clear patch data into the patch memory and executing the contents thereof.

There is also provided in accordance with the present invention apparatus for securely downloading and installing patch data in a plurality of computing devices, the patch data transmitted over an nonsecure channel in an encrypted manner using a first key comprising patch memory adapted to store the patch data, data memory, a processor, software means operative on the processor for receiving a first encrypted patch data transmitted to the computing devices and decrypting the first encrypted patch data utilizing the first key so as to generate clear patch data, verifying the integrity of the contents of the clear patch data; and if the verification passes, encrypting the clear patch data using a second key and storing the resultant second encrypted patch data in the data memory, retrieving the second encrypted patch data from the data memory and decrypting the second encrypted patch data using the second key so as to generate clear patch data and loading the clear patch data into the patch memory and executing the contents thereof.

There is further provided in accordance with the present invention a system for downloading and installing patch data on a plurality of communication platforms comprising transmission means for transmitting the patch data over a non-secure link to the plurality of communication platforms wherein the patch data is transmitted encrypted utilizing a first key, receiving means in each communication platform adapted to receive the patch data over the link, a data processor adapted to receive the encrypted patch data from the receiving means, a host device adapted to communicate with the data processor, the data processor comprising patch memory adapted to store the patch data, data memory, processing means, software means operative on the data processor for receiving a first encrypted patch data transmitted at a computing device and decrypting the first encrypted patch data utilizing the first key so as to generate clear patch data, verifying the integrity of the contents of the clear patch data; and if the verification passes, encrypting the clear patch data using a second key and storing the resultant second encrypted patch data in the data memory, retrieving the second encrypted patch data from the data memory and decrypting the second encrypted patch data using the second key so as to generate clear patch data and loading the clear patch data into the patch memory and executing the contents thereof.

BRIEF DESCRIPTION OF THE DRAWINGS

The invention is herein described, by way of example only, with reference to the accompanying drawings, wherein.

DETAILED DESCRIPTION OF THE INVENTION

| Notation Used Throughout The following notation is used throughout this document. | |
|---|---|
| Term | Definition |
| CRC | Cyclic Redundancy Code check |
| DSP | Digital Signal Processor |
| EEPROM | Electrically Erasable Programmable Read Only Memory |
| EEROM | Electrically Erasable Read Only Memory |

| Notation Used Throughout The following notation is used throughout this document. | |
|---|---|
| Term | Definition |
| EPROM | Erasable Programmable Read Only Memory |
| I/F | Interface |
| IC | Integrated Circuit |
| NVM | Nonvolatile Memory |
| NVRAM | Nonvolatile Memory Random Access Memory |
| PC | Personal Computer |
| RAM | Random Access Memory |
| ROM | Read Only Memory |
| WLAN | Wireless Local Area Network |
| WLL | Wireless Local Loop |

DETAILED DESCRIPTION

The present invention is an apparatus for and method of securely downloading and installing a program patch in a processing device and/or in other peripherals such as communication interfaces. The invention is particularly useful in situations whereby the program patch is transmitted over a communications channel that is particularly vulnerable to hacking device is built into a mobile communications platform.

For illustration purposes, the invention is described in the context of a digital signal processing (DSP) device that is adapted to receive a program patch from an external source. Note, however, that is not intended that the invention be limited to the example presented herein. It is appreciated that one skilled in the art can apply the principles of the invention to numerous other types of processing devices as well.

Figure 1:
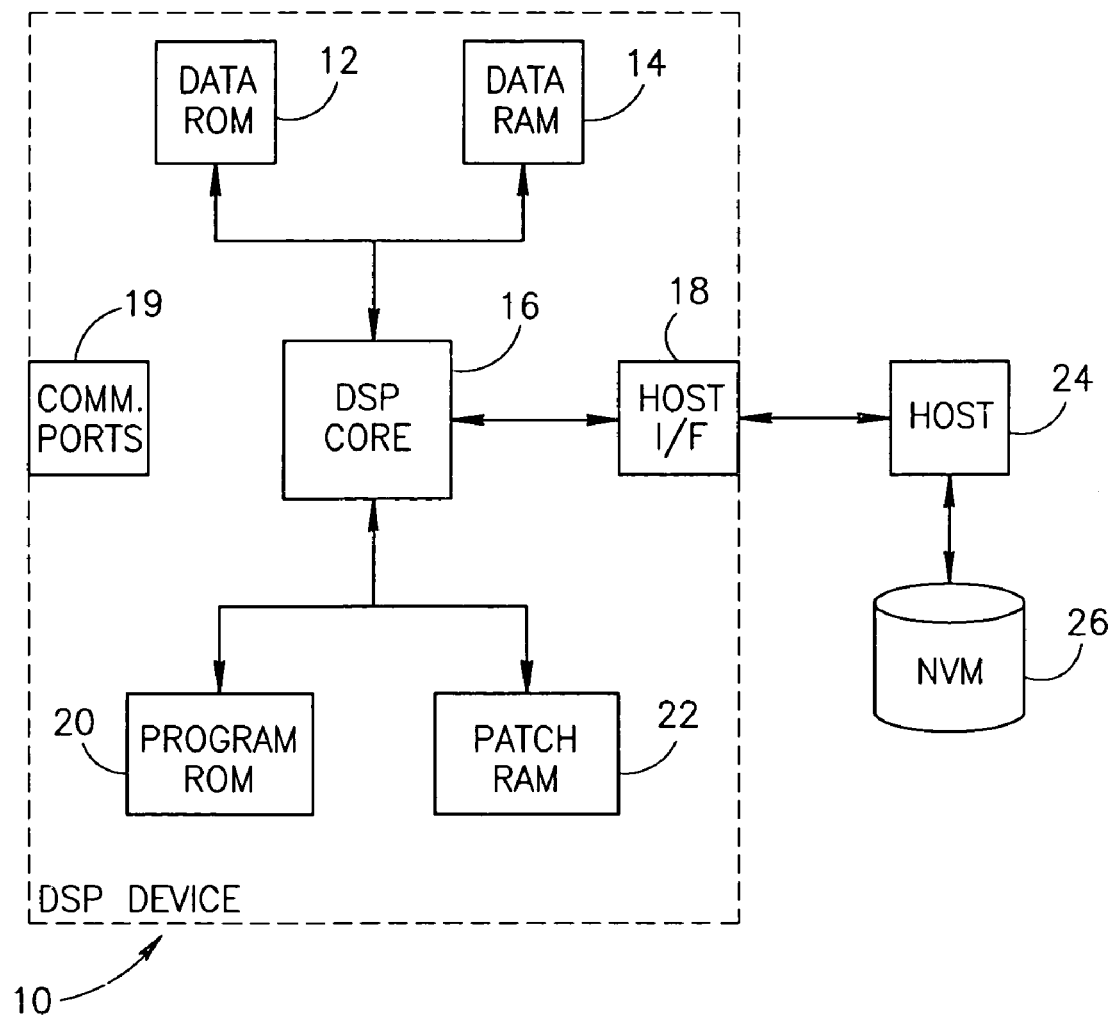
FIG. 1 is a diagram illustrating the internal architecture of a general purpose processing device.
Figure 2:
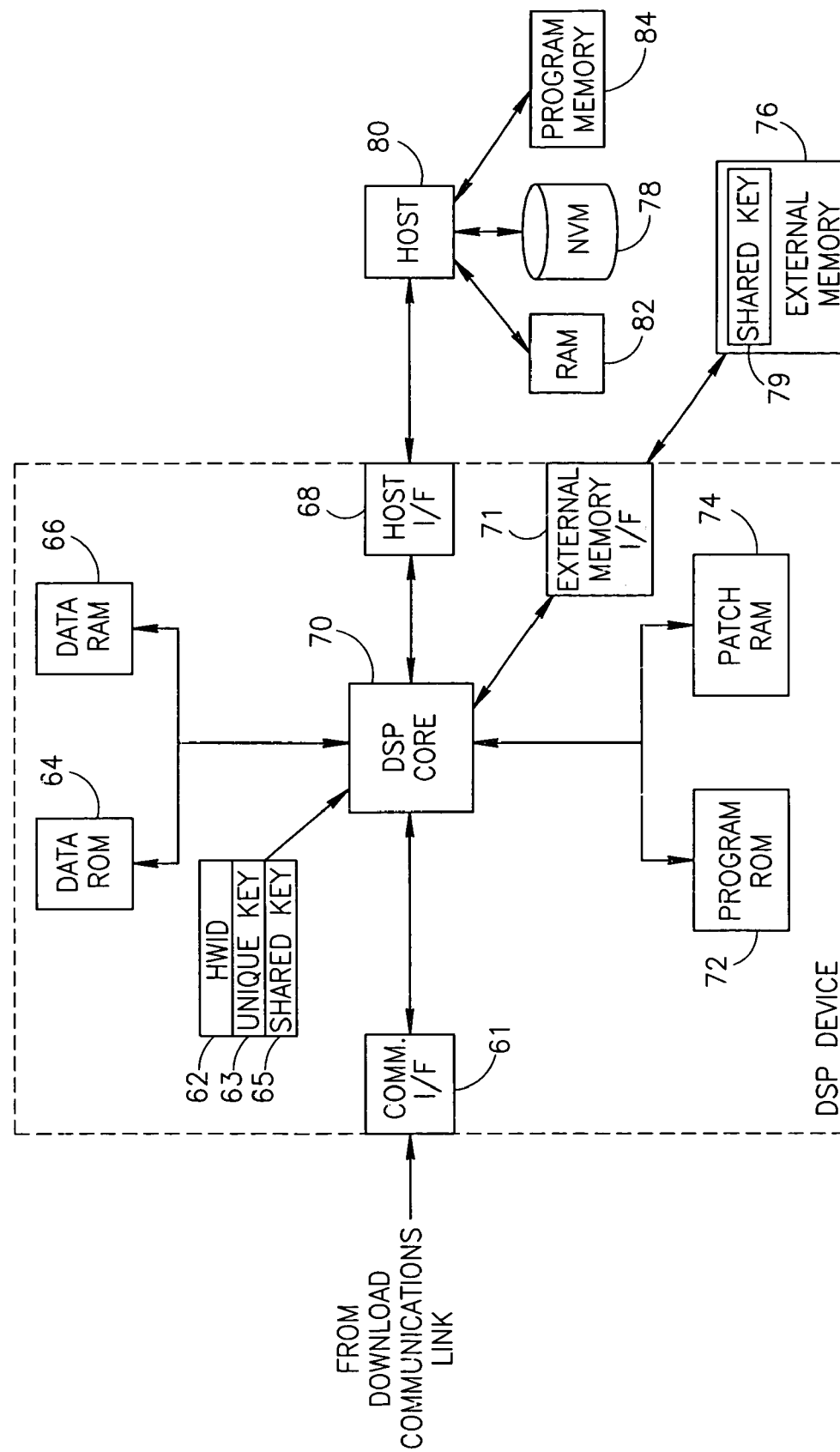
FIG. 2 is a block diagram illustrating a processor constructed in accordance with the present invention.

A block diagram illustrating a processor constructed in accordance with the present invention is shown in FIG. 2. The processing device, generally referenced 60, comprises a digital signal processor (DSP) designed to be optimized for signal processing applications and tasks. The device 60 comprises program read only memory (ROM) 72, patch random access memory (RAM) 74, data ROM 64, data RAM 66 and a processing core 70 optimized for performing digital signal processing operations. The device 60 also comprises one or more interfaces including communication ports 61 and a host interface 68.

A host device 80 communicates with the DSP device 60 via host interface 68. The host may comprise a personal computer (PC), microprocessor, microcomputer or other computing platform that functions as a host to the device 60. The host 80 comprises program memory 84, data memory 82 and nonvolatile memory 78 such as EEROM, Flash memory, EPROM, NVRAM, etc.

At the time of manufacture, the program ROM 72 in the device 60 is burned (i.e. programmed) with the program code for the DSP core 70. The program code is adapted to permit the device to perform all the required processing tasks. After manufacturing, the device is embedded in the product and released into the field. As is typical with most hardware/software systems, after some time in the field either bugs are found and/or new versions of the software are developed. At this point, it is desirable to upgrade the software in the program ROM 72 to either fix the bugs and/or install a new version of the software.

In most cases, once the device is manufactured, it is extremely difficult to nearly impossible to replace or change the contents of the program ROM. The patch RAM 74 is used for such purposes. A new program is developed and the change (or deltas) between the old program code and the new program code are generated. These changes are downloaded to the device as a patch program which is written into the patch RAM 74.

As described hereinabove, a well known technique is used whereby the modifications to the program are stored in nonvolatile memory 78 on the host. The patch RAM 74 is loaded from the host memory every time the device is reset. The processing device is constructed such that the patch RAM is within the program code (i.e. program ROM 72) address space. The format of the patch RAM comprises one or more patches wherein each patch comprises a start address, end address and the data to be inserted between them. In this manner, the processor knows where to insert the patch and the length of each patch.

The processing core operates by executing code from the program ROM. A trap is generated when the device arrives at a location that has corresponding content in the patch RAM. Rather than execute the contents of the original processor ROM, the processor executes the contents of the patch RAM instead.

Before the patch program can be executed, it must be downloaded and installed into the patch RAM. An apparatus and method for securely downloading and installing the patch program is provided by the present invention. In accordance with the invention, a program patch is securely downloaded simultaneously to a plurality of processing devices wherein each device receives the program patch encrypted using a shared key known to all the devices. The patch program is received over a communication link via communications interface 61.

The device decrypts the program patch using the shared key 65 that is either burned into the device during manufacturer or provided to the device from an external source. The clear text version of the program patch is then re-encrypted using the unique key 63 known only to the device itself. Each key 63 corresponds to a particular unique ID 62 and is burned into the device during manufacture. The encrypted text is stored in memory and decrypted each time the device is rebooted. The resultant clear text patch program is loaded into patch RAM and executed by the processing core whenever a patch is reached.

Note that alternatively, the shared key 79 may be stored in an external memory 76 such as nonvolatile memory. Preferably, the key is stored in and retrieved from NVM in a secure manner whereby the vulnerability of the key to attack by hackers is minimized. The device comprises an external memory interface 71 that is adapted to read and write key information to and from the external memory 76.

Secure Patch Download

Figure 3:
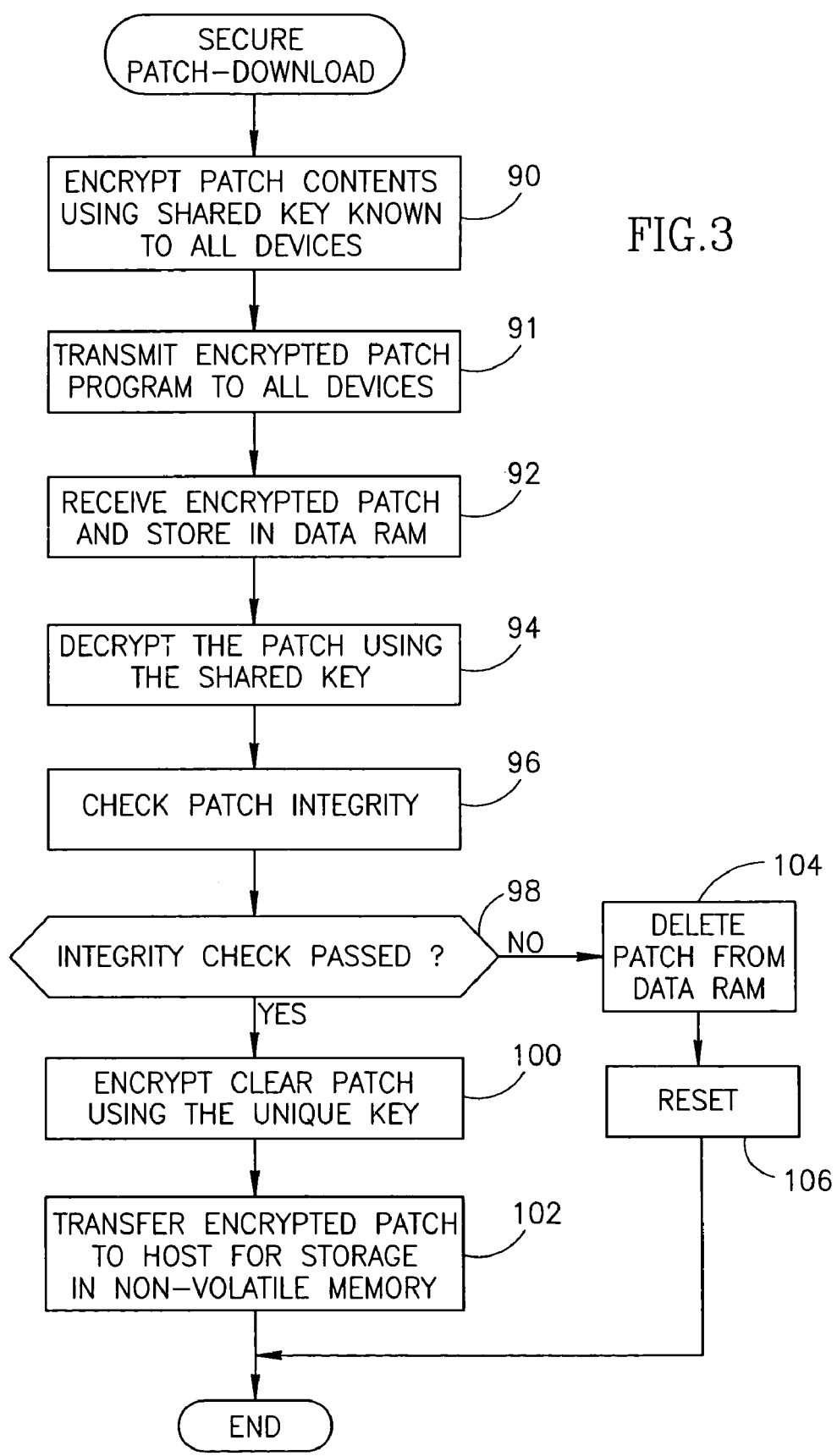
FIG. 3 is a flow diagram illustrating the secure patch download method of the present invention.

The method of securely downloading the program patch to the device will now be described in more detail. The method of installing the patch program, once received, is described infra. A flow diagram illustrating the secure patch download method of the present invention is shown in FIG. 3. The patch program is provided by the system within the data stream received by the device.

With reference to FIGS. 2 and 3, the contents of the patch program are first encrypted using the shared key that is known to devices intended to receive the patch (step 90). Note that alternatively, for added security, the devices may be divided into groups whereby each group has a different shared key associated with it. The patch program is encrypted using the shared key for each group. Therefore, multiple transmissions are required in order to communicate the patch to all the devices since each group has its own shared key.

The encrypted patch program is then transmitted to all devices intended to receive the updated patch (step 91). In the case of multiple groups of devices, a separate encrypted patch is transmitted for each group. Each device receives the transmission via receiving means coupled to the device (step 92). The encrypted patch received is stored in data RAM 66 within the device. Note that alternatively, the encrypted patch program may also be stored in host memory 82.

The patch program is then decrypted using the shared key 65 (strap 94). Note that in a less secure arrangement, the shared key 79 is stored in external memory 76 which the host must have access to. The integrity of the patch is then checked (step 96). During this step, the processor verifies that the patch came from an intended source and that it was received correctly without error.

If the patch fails the integrity check (step 98), i.e. it is determined the patch is either not from the intended source or errors were detected, the patch is deleted from memory (step 104) and the processor is reset (step 106).

If the integrity check on the patch passes (step 98), the clear text patch program is re-encrypted using the unique key known only to the processor (step 100). The key is a unique key that is not known to any other processing device, thus this step must be performed by the processor. The resultant encrypted patch program is then stored in memory (step 102). Preferably, the encrypted patch program is transferred to the host 80 and stored in nonvolatile memory 78. Alternatively, the patch is stored in nonvolatile memory but may be stored in volatile memory as well. The device may comprise internal nonvolatile memory for storing the patch.

Secure Patch Installation

Figure 4:
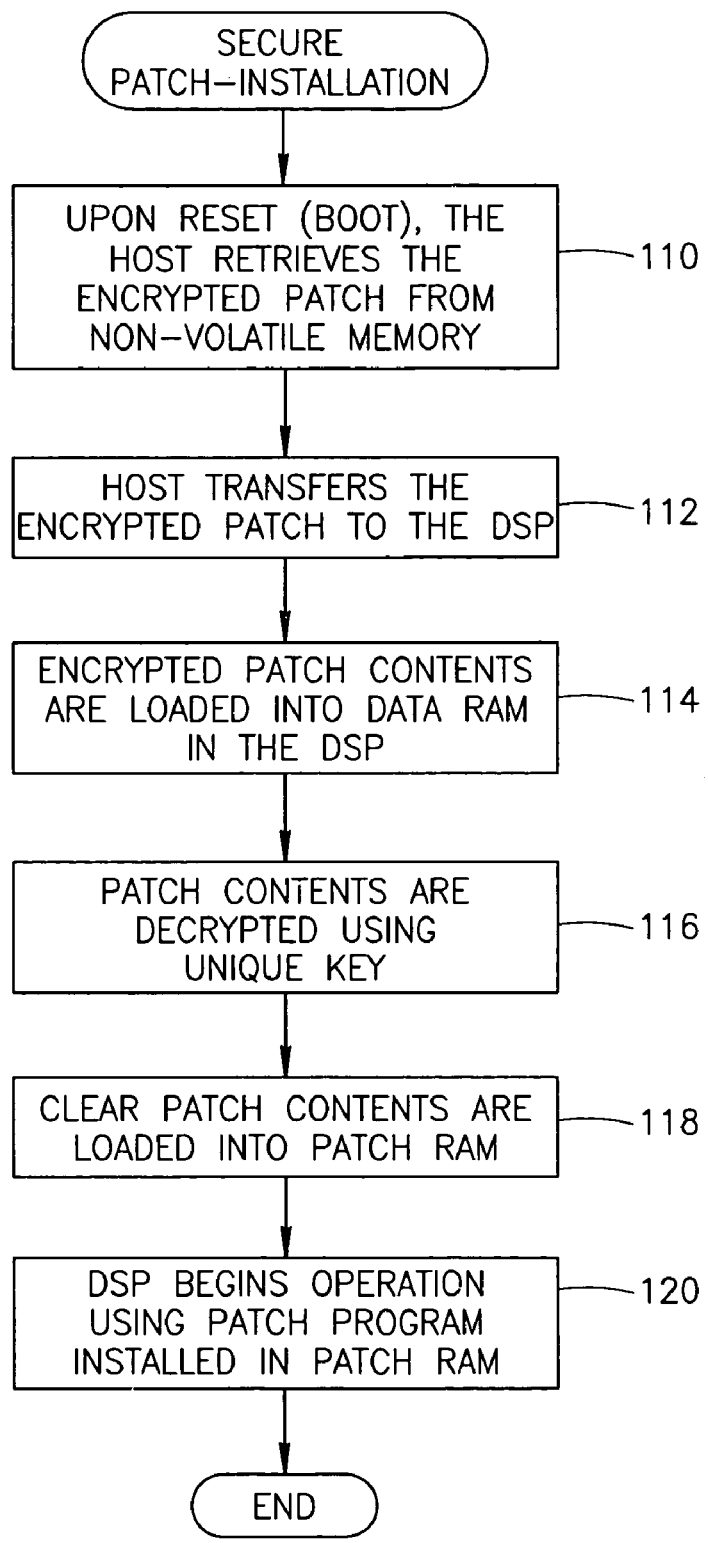
FIG. 4 is a flow diagram illustrating the secure patch installation method of the present invention.

The method of securely installing the patch in patch RAM will now be described in more detail. A flow diagram illustrating the secure patch installation method of the present invention is shown in FIG. 4. Upon reset of the device, the patch program is retrieved from NVM, decrypted and installed in patch RAM 74. If the encrypted patch program is stored in host memory 82 or host nonvolatile memory 78, the host first receives the encrypted patch program from memory (step 110) and transfers it to the processing device (step 112) upon reset thereof. Alternatively, if the encrypted patch program is stored in memory within the device, the device is operative to retrieve it from internal memory upon reset.

Once retrieved from memory, the encrypted patch program is then stored in data RAM within the device (step 114). The contents of the patch program are then decrypted using the unique key (step 116). The unique key is retrieved from internal key storage location 63 within the device.

The clear text patch program is then loaded into patch RAM 74 (step 118). The processing device then begins operation using the installed patch program (step 120). As described previously, the processor initializes the program counter and begins executing instructions from the program ROM. When an address is reached that matches an address stored in the path RAM, a software trap is generated and the program continues executing code stored in the patch RAM.

Thus, using at least a two key encryption process, the patch program is securely downloaded, stored and installed on the processing device. Use of the second encryption key has the advantage of providing a second level of security in the event the shared key is compromised. Since the shared key is typically known by a large number of devices, it is more likely to be compromised. Another reason that a second unique key is used is that the shared key may be changing at a relatively frequent rate. It is more efficient and practical to store the patch program encrypted using the permanent unique key rather than the transitory shared key. This is especially true considering that a patch program may be in a service for relatively long periods of time.

Further, it is important that the patch program is encrypted between the external source and the device itself since it is possible that a hacker may connect to the device and download their own patch. The patch may instruct the radio to read out the contents of program memory thus compromising key algorithms used by the device. Alternatively, the patch may instruct the device to output encryption key information to a port thus compromising the security of the system.

Application Example

Figure 5:
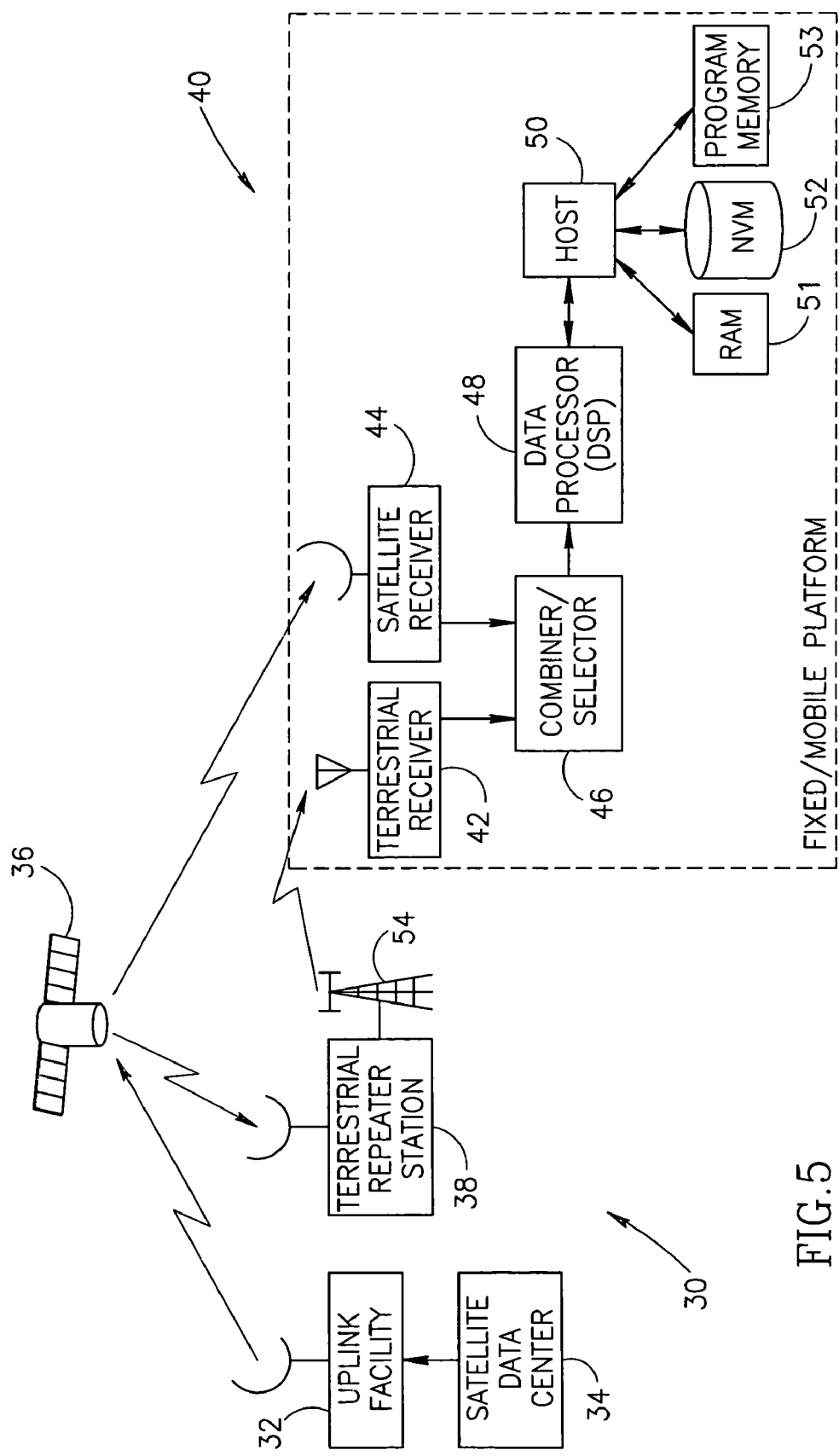
FIG. 5 is a block diagram illustrating an example application of the present invention whereby a computing platform is adapted to securely download and install a patch data transmitted by satellite.

An example application of the invention will now be presented. The example comprises a digital radio broadcast system whereby data is broadcast to a plurality of fixed or mobile platforms. A block diagram illustrating an example application of the present invention whereby a computing platform is adapted to securely download and install patch data transmitted by satellite is shown in FIG. 5. The system, generally referenced 30, comprises means for broadcasting data to a plurality of fixed or mobile platforms 40 including a satellite data center 34, an uplink facility 32 and satellite 36. The satellite transmission is augmented by a network of terrestrial repeater stations 38 with attached transmitter antennas 54.

The fixed/mobile platform 40 comprises a terrestrial receiver 42, satellite receiver 44, combiner/selector 46, data processor (i.e. DSP) 48 and host device 50. The host comprises data memory 51 (i.e. RAM), program memory 53 and nonvolatile memory 52.

The data processor 48 (i.e., the DSP device) is constructed in accordance with the present invention and is located in a mobile platform which may comprise a digital radio. The radio is adapted to receive broadcasts from wireless sources such as satellites, cellular network, terrestrial wireless network, etc. Note that it is not intended that the invention be limited to the example application presented herein. It is appreciated that one skilled in the art can apply the principles of the present invention to numerous other communication systems and types of platforms as well.

In this example application, the platform may comprise a radio or other communication device adapted to receive and progress signals broadcast from the satellite 36 and/or the terrestrial repeater station network. The terrestrial stations are operative to receive the signal from the satellite and rebroadcast it over a terrestrial link. The terrestrial stations thus enable the radio to receive signal when reception from the satellite is blocked.

When it is desired to upgrade the program code in all the radios in the system, a program patch is generated and encrypted using the shared key known to all or a portion of radios. The encrypted patch is broadcast via the satellite and terrestrial links and received by each platform 40. The patch originates with the satellite data center 34 and is transmitted over the uplink to the satellite via uplink facility 32.

The signal is received by the satellite receiver 44 and/or the terrestrial receiver 42. Depending on the quality of the received transmission, the combiner selector 46 either (1) chooses the output of either the satellite receiver 42 or the terrestrial receiver 44 if one or the other was not received or (2) combines the messages received from both receivers in the event reception over both was in error.

The received encrypted patch program is then input to the data processor 48 which is adapted to perform the secure download method described previously in connection with FIG. 3. Once the patch is securely downloaded and stored in a memory, it is installed upon reset of the processor 48. The data processor is adapted to perform the secure installation method described previously in connection with FIG. 4.

Thus, the invention provides a mechanism for securely upgrading the plurality of radios in the system with new versions of software. Encrypting the download in accordance with the invention enables the patch to be downloaded securely thus greatly reducing the system's vulnerability to hacking. Re-encrypting the patch program insulates the device from changes in the shared key since the unique key is permanently assigned to a radio. In addition, encrypting the patch with the unique key adds another level of security in the event the shared key is compromised.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of securely downloading and installing a patch program in a plurality of computing devices, each computing device having a processor, program memory and patch memory, said method comprising the steps of:
   encrypting the entire contents of said patch program using a shared key to generate a first encrypted patch program, said shared key being known to a plurality of computing devices;
   transmitting said first encrypted patch program to a plurality of said computing devices over a nonsecure communications channel;
   receiving said first encrypted patch program at a computing device;
   decrypting said first encrypted patch program utilizing said shared key to generate a first clear patch program;
   re-encrypting the entire contents of said clear patch program utilizing a unique key known only to and hardwired into that particular computing device and storing a resultant second encrypted patch program in memory;
   upon subsequent reset, retrieving said second encrypted patch program from said memory and decrypting said second encrypted patch program utilizing said unique key to generate a second clear patch program; and
   loading said second clear patch program into said patch memory for execution by said computing device.

2. The method according to claim 1, wherein said patch program is received from a satellite adapted to forward said patch data transmitted from a central data center.

3. The method according to claim 1, wherein said patch program is received from a terrestrial repeater station adapted to forward said patch data transmitted from a central data center.

4. The method according to claim 1, wherein said nonsecure channel comprises a satellite downlink.

5. The method according to claim 1, wherein said nonsecure channel comprises a terrestrial wireless link.

6. The apparatus according to claim 1, wherein said computing device comprises the data processor portion of a radio receiver adapted to receive a signal transmitted from a satellite downlink.

7. The method according to claim 1, wherein said computing device comprises the data processor portion of a radio receiver adapted to receive a signal transmitted from a terrestrial repeater station.

8. The method according to claim 1, wherein said shared key is known to all computing devices in said system.

9. The method according to claim 1, wherein said shared key is known to a portion of computing devices in said system.

10. The method according to claim 1, wherein said second encrypted patch program is stored in random access memory (RAM) integral to said device.

11. The method according to claim 1, wherein said second encrypted patch program is stored in random access memory (RAM) located in a host device in communication with said computing device.

12. The method according to claim 1, wherein said second encrypted patch program is stored in nonvolatile memory (NVM) integral to said computing device.

13. The method according to claim 1, wherein said second encrypted patch data is stored in nonvolatile memory )NVM) located in a host device in communication with said computing device.

14. The method according to claim 1, wherein said shared key is hardwired within said computing device.

15. The method according to claim 1, wherein said unique key is stored in nonvolatile memory external to said computing device.

16. The method according to claim 1, wherein said unique key is derived from a unique ID burnt into said computing device.

17. The method according to claim 1, further comprising the step of verifying the integrity of the contents of said first clear patch program.

18. The method according to claim 17, further comprising the step of deleting said first encrypted patch program and aid first clear patch program from said device in the event said verification fails.

19. The method according to claim 17, further comprising the step of deleting said first encrypted patch program and said first clear patch program from said device and substantially rebooting said device in the event said verification fails.

20. An apparatus for securely downloading and installing a patch program in a plurality of computing devices, the entire contents of said patch program encrypted at a central location using a shared key known to a plurality of computing devices to generate a first encrypted patch program which is transmitted over a nonsecure communications channel, comprising:
    patch memory adapted to store said patch program;
    data memory;
    software means operative on said processor to:
        receiving said first encrypted patch program transmitted to said computing devices and decrypting said first encrypted patch program utilizing said shared key to generate a first clear patch program;
        re-encrypting the entire contents of said clear patch program utilizing a unique key known only to and hardwired into that particular computing device and storing a resultant second encrypted patch program in said memory;
        upon subsequent reset, retrieving said second encrypted patch program from said memory and decrypting said second encrypted patch program utilizing said unique key to generate a second clear patch program; and
        loading said second clear patch program into said patch memory for execution by said computing device.

21. The apparatus according to claim 20, wherein said patch program is received from a satellite adapted to forward said patch data transmitted from a central data center.

22. The apparatus according to claim 20, wherein said patch program is received from a terrestrial repeater station adapted to forward said patch data transmitted from a central data center.

23. The apparatus according to claim 20, wherein said nonsecure channel comprises a satellite downlink.

24. The apparatus according to claim 20, wherein said nonsecure channel comprises a terrestrial wireless link.

25. The apparatus according to claim 20, wherein said computing device comprises the data processor portion of a radio receiver adapted to receive a signal transmitted from a satellite downlink.

26. The apparatus according to claim 20, wherein said computing device comprises the data processor portion of a radio receiver adapted to receive a signal transmitted from a terrestrial repeater station.

27. The apparatus according to claim 20, wherein said shared key is known to all computing devices in said system.

28. The apparatus according to claim 20, wherein said shared key is known to a portion of computing devices in said system.

29. The apparatus according to claim 20, wherein said data memory comprises random access memory (RAM) integral to said computing device.

30. The apparatus according to claim 20, wherein said data memory comprises random access memory (RAM) located in a host device in communication with said computing device.

31. The apparatus according to claim 20, wherein data memory comprises nonvolatile memory (NVM) integral to said device.

32. The apparatus according to claim 20, wherein said data memory comprises nonvolatile memory (NVM) located in a host device in communication with said computing device.

33. The apparatus according to claim 20, wherein said shared key is hardwired within said computing device.

34. The apparatus according to claim 20, wherein said unique key is hardwired within said computing device.

35. The apparatus according to claim 20, wherein said unique key is stored in nonvolatile memory external to said computing device.

36. The apparatus according to claim 20, wherein said unique key is derived from a unique ID unique amoung all computing devices and permanently burnt into said computing device.

37. The apparatus according to claim 20, wherein said software means is operative to verify the integrity of the contents of said first clear patch program.

38. The apparatus according to claim 37, wherein said software means is operative to delete said first encrypted patch program and said first clear patch program from said device in the event said verification fails.

39. The apparatus according to claim 37, wherein said software means is operative to delete said first encrypted patch program and said first clear patch program from said device and substantially reboot said computing device in the event said verification fails.

40. A system for downloading and installing a patch program on a plurality of communication platforms, comprising:
encryption means for encrypting the entire contents of said patch program using a shared key known to a plurality of communication platforms to generate a first encrypted patch program;
transmission means for transmitting said first encryption patch program over a nonsecure communications link to a plurality of communication platforms;
receiving means in each communications platform adapted to receive said first encrypted patch program over said nonsecure communication link;
a data processor adapted to receive said first encrypted patch program from said receiving means;
a host device adapted to communicate with said data processor; and
said data processor comprising:
patch memory adapted to store said patch program;
data memory;
processing means;
software means operative on said data processor for:
receiving said first encrypted patch program and decrypting said first encrypted patch program utilizing said shared key to generate a first clear patch program;
re-encrypted the entire contents of said clear patch program utilizing a unique key known only to and hardwired into that particular computing platform and storing a resultant second encrypted patch program in said memory;
upon subsequent reset, retrieving said second encrypted patch program from said memory and decrypting said second encrypted patch program utilizing said unique key to generate a second clear patch program; and
loading said second clear patch program into said patch memory for execution by said processing means.

41. The system according to claim 40, wherein said transmission means comprises means for transmitting said first encrypted patch program from a central data center via a satellite to said plurality of communication platforms.

42. The system according to claim 40, wherein said transmission means comprises means for transmitting said first encrypted patch program from a central data center via a terrestrial repeater station to said plurality of communication platforms.

43. The system according to claim 40, wherein said nonsecure link comprises a satellite downlink.

44. The system according to claim 40, wherein said nonsecure link comprises a terrestrial wireless link.

45. The system according to claim 40, wherein said communications platform comprises a portable or fixed radio operative to receive, demodulate and decode a signal broadcast via satellite.

46. The system according to claim 40, wherein said communications platform comprises a portable or fixed radio operative to receive, demodulate and decode a signal broadcast via a terrestrial repeater solution.

47. The system according to claim 40, wherein said shared key is known to all communications platforms in said system.

48. The system according to claim 40, wherein said shared key is known to a portion of communications platforms in said system.

49. The system according to claim 40, wherein said data memory comprises random access memory (RAM) integral to said data processor.

50. The system according to claim 40, wherein said data memory comprises random access memory (RAM) coupled to said host device.

51. The system according to claim 40, wherein data memory comprises nolvolatile memory (NVM) integral to said data processor.

52. The system according to claim 40, wherein said data memory comprises nonvolatile memory (NVM) coupled to said host device.

53. The system according to claim 40, wherein said shared key is hardwired within said data processor.

54. The system according to claim 40, wherein said unique key is hardwired within said data processor.

55. The system according to claim 40, wherein said unique key is stored in nonvolatile memory external to said data processor.

56. The system according to claim 40, wherein said unique key is derived from an ID unique among all communication platforms and permanently burnt into said data processor.

57. The system according to claim 40, wherein said software is operative to verify the integrity of the contents of said first clear patch program.

58. The system according to claim 57, wherein said software means is operative to delete said first encrypted patch program and said first clear patch program from said communication platform in the event said verification fails.

59. The system according to claim 57, wherein said software means is operative to delete said first encrypted patch program and said first clear patch program from said communication platform and subsequently reboot said communication platform in the event said verification fails.

60. A method of securely downloading a patch program in a plurality of computing devices each having a processor, program memory and patch memory, said method comprising the steps of:
encrypting the entire contents of said patch program using a shared key to generate a first encrypted patch program, said shared key being known to a plurality of computing devices;
transmitting said first encrypted patch program to a plurality of said computing devices over a nonsecure communication channel;
receiving said first encrypted patch program at a computing device;
decrypting said first encrypted patch program utilizing said shared key to generate a first clear patch program;
verifying the integrity of said first clear patch program; and if said verification is successful, re-encrypting the entire contents of said clear patch program utilizing a unique key known only to and hardwired into that particular computing device and storing a resultant second encrypted patch program in memory.

61. The method of claim 60, further comprising the steps of:
upon subsequent reset, retrieving said second encrypted patch program from said memory;
decrypting said second encrypted patch program using said unique key to generate a second clear patch program; and loading said second clear patch program into said patch memory for execution by said processor.

62. An apparatus for securely downloading a patch program in a plurality of computing devices, the entire contents of said patch program encrypted using a shared key known to a plurality of computing device to generate a first encrypted patch program that is transmitted over a nonsecure communications channel, comprising:

a processor;

volatile patch memory coupled to said processor and adapted to store a second clear patch program;

data memory coupled to said processor;

software means operative on said processor to:
  receive said first encrypted patch program and decrypt said first encrypted patch program utilizing said shared key to generate a first clear patch program;
  verify the integrity of said first clear patch; and if said verification is successful, re-encrypt the entire contents of said clear patch program utilizing a unique key known only to and hardwired into that particular computing device and store a resultant second encrypted patch program in said memory.

63. The apparatus of claim 62, wherein said software means is further operative to:
  after each subsequent reset, retrieve said second encrypted patch program from said data memory;
  decrypt said second encrypted patch program using said unique key to generate a second clear patch; and
  load said second clear patch program into said patch memory for execution by said processor.

64. The apparatus according to claim 62, wherein said software means is operative to verify the integrity of the contents of said first clear patch program and if verification fails, to delete said first encrypted patch program and said first clear patch program from memory.

* * * * *